United States Patent [19]
Banks, III

[11] Patent Number: 6,152,853
[45] Date of Patent: Nov. 28, 2000

[54] VEHICLE EXHAUST BRAKE AND CONTROL SYSTEM

[76] Inventor: Gale C. Banks, III, 157 Sawpit La., Bradbury, Calif. 91010

[21] Appl. No.: 09/287,975

[22] Filed: Apr. 7, 1999

[51] Int. Cl.[7] ................................................ F16H 5/40
[52] U.S. Cl. .............................. 477/186; 477/119; 477/92
[58] Field of Search ............................ 477/92, 119, 186; 123/323; 701/110

[56] References Cited

U.S. PATENT DOCUMENTS

| | | | |
|---|---|---|---|
| 4,061,215 | 12/1977 | Ishikawa | 192/4 A |
| 4,669,435 | 6/1987 | Furusawa et al. | 123/323 |
| 4,787,044 | 11/1988 | Nagata et al. | 701/110 |
| 4,882,906 | 11/1989 | Sekiyama et al. | 60/624 |
| 4,961,484 | 10/1990 | Kato et al. | 192/3.31 |
| 5,124,923 | 6/1992 | Takahashi | 701/110 |
| 5,282,399 | 2/1994 | Sano et al. | 192/4 A X |
| 5,315,899 | 5/1994 | Mochizuki | 477/119 |
| 5,362,285 | 11/1994 | Sano et al. | 477/92 |
| 5,568,387 | 10/1996 | Andersson | 701/110 |
| 5,699,767 | 12/1997 | Notsu et al. | 123/323 |
| 5,754,968 | 5/1998 | Hedstrom | 701/66 |
| 5,830,105 | 11/1998 | Iizuka | 477/92 |
| 5,842,952 | 12/1998 | Onimaru et al. | 477/174 |

FOREIGN PATENT DOCUMENTS

| | | |
|---|---|---|
| 56-126636 | 10/1981 | Japan . |
| 63-135644 | 6/1988 | Japan . |
| 64-87963 | 4/1989 | Japan . |
| 2-258462 | 10/1990 | Japan . |
| 2-278069 | 11/1990 | Japan . |
| 59-80561 | 11/1990 | Japan . |

*Primary Examiner*—Khoi Q. Ta
*Attorney, Agent, or Firm*—Lyon & Lyon LLP

[57] ABSTRACT

An exhaust brake control system for a vehicle drive train having an internal combustion engine with an exhaust system includes an exhaust brake valve in the exhaust system. Further, a controller controls the exhaust brake valve through a number of position commands from fully open to fully closed. Inputs to the controller affecting its operation include a speed sensor, a drive coupling sensor, a gear selection sensor, an overdrive gear sensor, an engine speed sensor, a throttle sensor, a pressure sensor and a warm-up sensor. A user interface both receives and sends information from and to the controller. The exhaust brake control system not only includes modulation of the exhaust brake, but also provides for control of a torque converter clutch, automatic transmission and overdrive. With throttled engines the intake throttle valve can be opened and the fuel supply disabled. Modulation of the exhaust brake valve is responsive to speed and acceleration. Control over the remaining engine and drive train components is used to enhance the operation of the exhaust brake valve.

36 Claims, 10 Drawing Sheets

VEHICLE EXHAUST BRAKE AND CONTROL SYSTEM

BACKGROUND OF THE INVENTION

The field of the present invention is vehicle exhaust brakes and the control thereof.

Exhaust brakes are typically valves operatively positioned in exhaust systems of internal combustion engines for greatly impeding the flow of exhaust gases from the engine. Such devices are commonly employed on diesel engines which are not throttled. They may be used on throttled gasoline engines as well. In principle, the exhaust brake resists exhaust flow from the engine under conditions when the engine is run by power derived from the wheels through the drive train rather than by internal combustion. Under such circumstances, the engine operates as a piston pump, drawing air through the intake and forcing it through the exhaust. By restricting exhaust flow, greater pressures are experienced within the engine cylinders to create retarding or braking power. In this way, power is absorbed by the engine to slow the vehicle.

Such exhaust brakes are located within the exhaust system downstream of the engine exhaust manifold. Butterfly valves with restricted holes therethrough or measured clearance about the periphery are pivotally mounted within the exhaust system. Most commonly, the vehicle operator has access to a switch within the vehicle cab to either activate or deactivate the valve. The valve is often controlled by one of a hydraulic cylinder, a pneumatic vacuum or pressure cylinder and an electric actuator. Links typically convert linear actuation to valve rotation. Recent such brakes offer the operator a choice of valve positions controlled through a selector within the cab.

Exhaust brakes are understood to be most prevalent on diesel engines. Such brakes are less effective on gasoline engines because such engines are throttled. With engine power off, modern gasoline internal combustion engines can include electronic control for disabling the fuel injection system. In addition, the throttle valve or valves within the engine intake are closed when power is not applied. Vacuum is generated in the intake with the engine in this mode. With the throttle valve on the engine intake closed, the ability of the valve in an exhaust brake to develop pressure within the engine is severely compromised. Consequently, with the fuel off and the exhaust brake on, it has been found advantageous to open an intake throttle valve or valves in order that the exhaust brake can be fully enabled.

As the exhaust brake is designed to substantially increase pressure within the exhaust manifold and, in turn, the engine itself when the power is off, such brakes typically are deactivated with application of the accelerator pedal. With initiation of internal combustion, significantly more exhaust flow is created which, without the automatic shutoff, would result in damaging overpressure and heat.

With the need to disable the exhaust valve upon application of power to the engine and with the limited control capability on the valves of such engine brakes, a desired speed range is often difficult to maintain unless the downgrade is sufficiently steep that both the engine brake and the wheel brakes are needed to prevent acceleration. In such a circumstance, the wheel brakes modulate the braking to maintain a desired speed. The more current exhaust brake designs have multiple settings selected by the operator from the cab. The multiple settings offer finite additional control. Even so, the settings are not responsive to vehicle conditions.

SUMMARY OF THE INVENTION

The present invention is directed to an exhaust braking system including both apparatus and method. The invention contemplates modulation of an exhaust brake responsive to engine conditions.

In a first separate aspect of the present invention, an exhaust brake for a vehicle drive system includes a vehicle speed sensor, an exhaust brake valve and a controller defining a valve open position command, a valve closed position command and intermediate position commands therebetween. The position of the valve is determined by conditions of the vehicle drive system including a speed signal from the vehicle speed sensor. Through such a system, target conditions can be presented which the controller operates to approach. Consequently, the overall braking system is more flexible in achieving selected speeds.

In a second separate aspect of the present invention, an exhaust brake for a vehicle drive system includes a vehicle speed sensor, an exhaust brake valve and a controller defining a valve open position command, a valve closed position command and intermediate position commands therebetween. The position of the valve is determined by conditions of the vehicle drive system including the vehicle speed and the magnitude of acceleration. Through such a system, response to target conditions which the controller operates to approach can vary depending upon need. Consequently, the overall braking system is more flexible and responsive in achieving selected speeds.

In a third separate aspect of the present invention, the features of the first or second separate aspects further include an internal combustion engine with an exhaust system as part of a drive system. In the case of a gasoline internal combustion engine with an intake throttle valve, the controller further includes a throttle open signal to the intake. For diesel engines, such a signal is unnecessary.

In a fourth separate aspect of the present invention, an exhaust brake for a vehicle drive system which includes an internal combustion engine, an exhaust system and an automatic transmission includes a vehicle speed sensor, an exhaust brake valve and a controller in communication with the speed sensor and coupled with the exhaust brake valve. The controller modulates the valve based upon parameters of the vehicle such as vehicle speed, vehicle acceleration and exhaust manifold back pressure. The controller includes output shift signals in communication with the automatic transmission. The controller is able to employ both higher and lower gearing to assist in exhaust braking control. Control can additionally be extended by locking and unlocking a torque converter clutch.

In a fifth separate aspect of the present invention, an exhaust brake for a vehicle drive system includes a exhaust manifold pressure sensor, an exhaust brake valve and a controller defining a valve open position command, a valve fully shut position command and intermediate position commands therebetween. The position command of the controller is determined by conditions of the exhaust manifold pressure. Through such a system, increased braking efficiency can be achieved at low engine speeds.

In a sixth separate aspect of the present invention, a method of braking contemplates the selection of a vehicle speed value, a sensing of the vehicle speed and a comparison between the two. Exhaust flow is modulated responsive to the difference between the vehicle speed value and the vehicle speed.

In a seventh separate aspect of the present invention, the features of the sixth separate aspect further include the calculation of the rate of change of the vehicle speed. More or less aggressive changes in any of the valve modulation, transmission gear selection and torque converter clutch engagement can be employed based on the rate of change of the vehicle speed.

In an eighth separate aspect of the present invention, a method of braking contemplates the sensing of the exhaust manifold pressure. Exhaust flow is modulated responsive to the exhaust manifold pressure. Greater braking efficiency is achieved at low engine speeds.

In a ninth separate aspect of the present invention, combinations of any of the foregoing aspects are contemplated.

Accordingly, it is an object of the present invention to provide improved exhaust brake systems offering greater flexibility and control. Other and further objects and advantages will appear hereinafter.

DETAILED DESCRIPTION OF THE PREFERRED EMBODIMENTS

Figure 1:
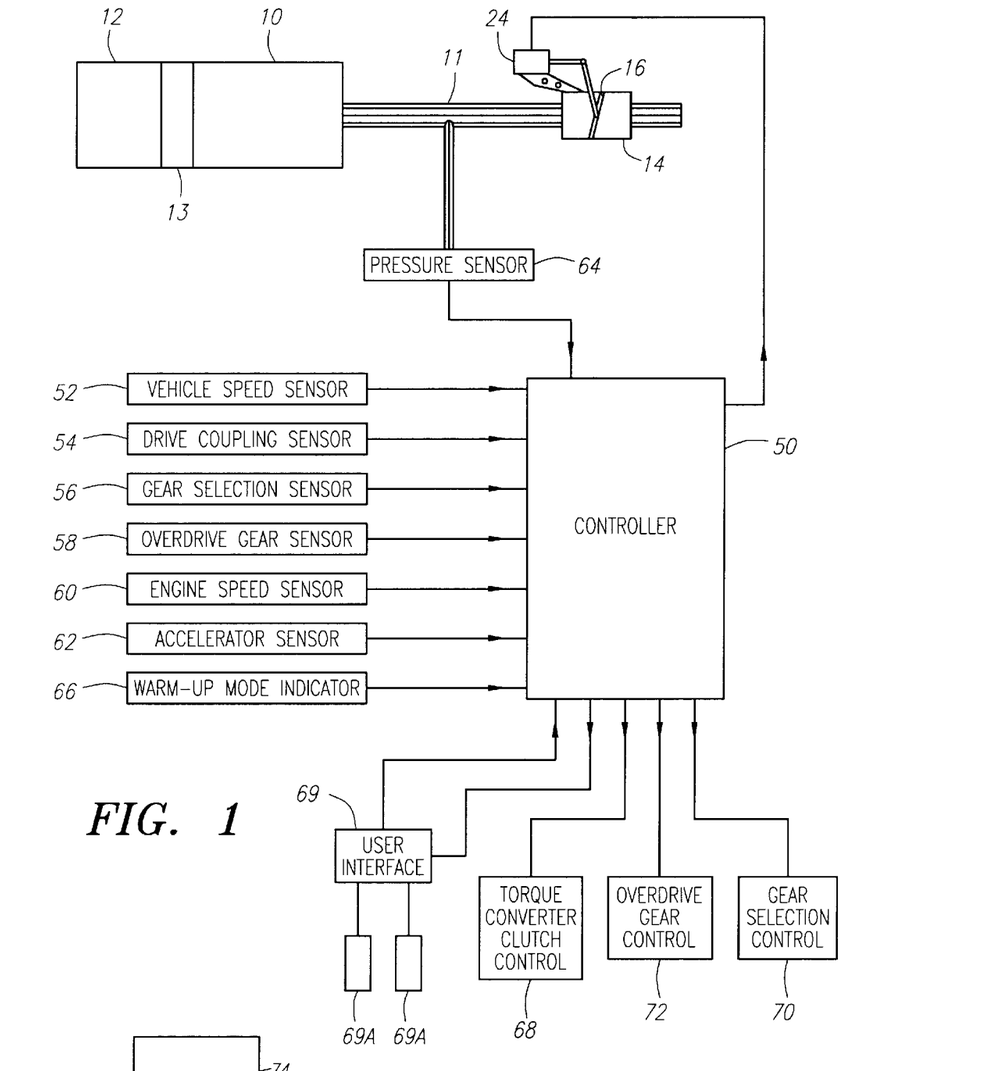
FIG. 1 is a schematic view of a vehicle exhaust brake and control system.

An exhaust brake for a vehicle is shown schematically in FIG. 1. An internal combustion engine 10 includes an exhaust system 11. The engine 10 is part of a vehicle drive system which may include an automatic transmission 12 and a drive coupling such as a torque converter and torque converter clutch 13. Alternatively, the vehicle drive system may include a manual transmission 12 and a drive coupling such as a clutch 13. Further, the engine 10 may either be a diesel or a gasoline engine. The exhaust system 11 for modern vehicle internal combustion engines typically includes a manifold extending from each engine exhaust port to accumulate the exhaust. An exhaust brake, generally designated 14, is typically located in the exhaust system 11 downstream of the manifold. The portion of the exhaust system 11 between the engine 10 and the exhaust brake 14 is to be of sufficient integrity so that elevated exhaust pressures can be sustained without leakage and damage.

Figure 2:
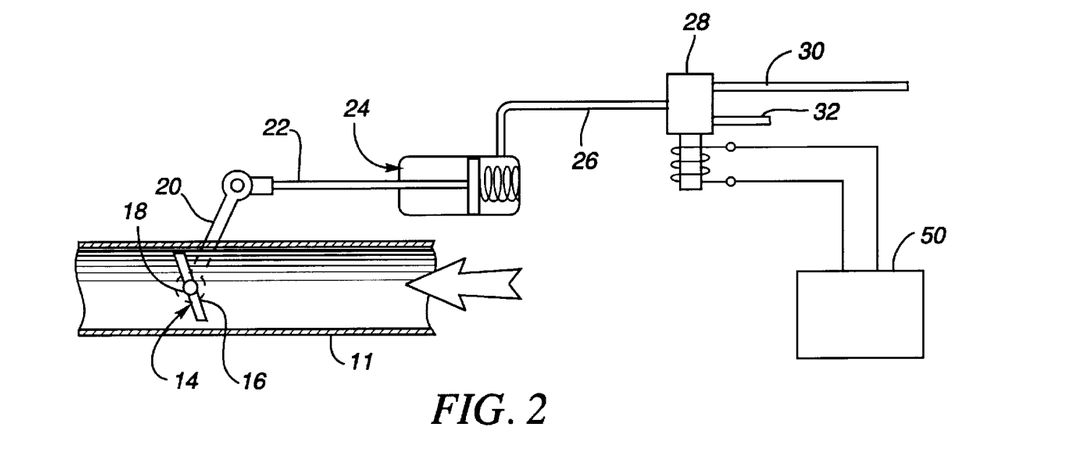
FIG. 2 is a mechanical schematic of a pneumatic controlled exhaust brake.
Figure 3:
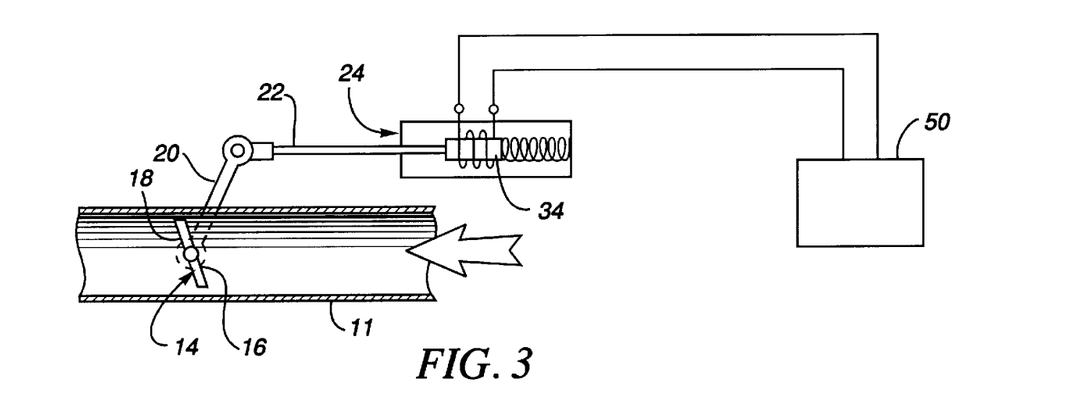
FIG. 3 is a mechanical schematic of an electric actuator controlled exhaust brake.
Figure 4:
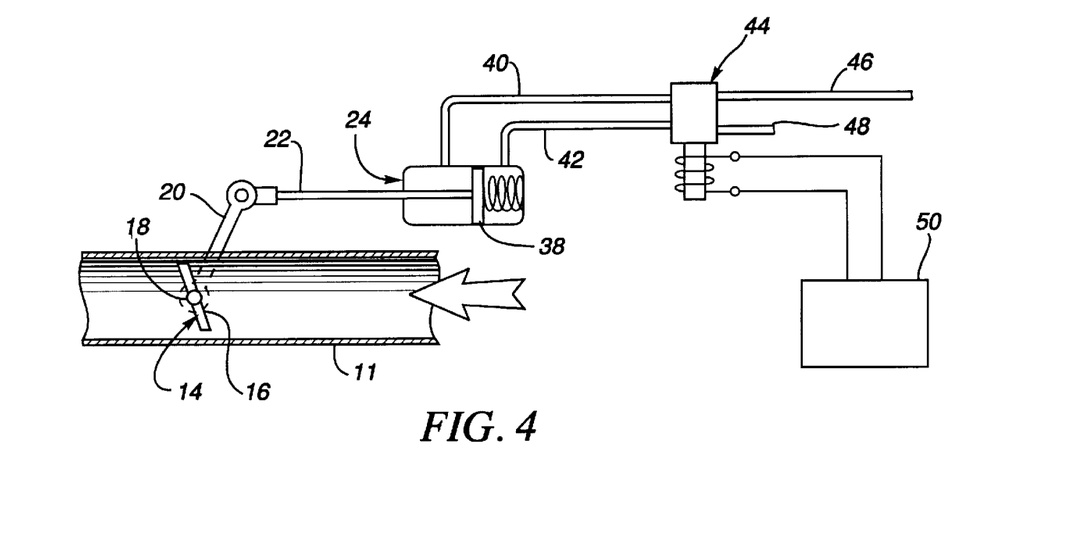
FIG. 4 is a mechanical schematic of a hydraulic controlled exhaust brake.

The exhaust brake 14 is illustrated in a number of configurations in FIGS. 2, 3 and 4. The exhaust brake 14 is shown to include an exhaust brake valve 16 which is a butterfly valve pivotally mounted about an axis 18 within the exhaust system 11. A link 20 is shown fixed to pivot about the axis 18 for actuation of the valve 16. The link 20 is also pinned to an actuator rod 22. An actuator 24 is coupled with the actuator rod 22. FIG. 1 illustrates a generic actuator 24. FIG. 2 illustrates a pneumatic actuator 24. The pneumatic actuator 24 includes a pneumatic line 26 and a solenoid valve 28 modulating the connections of the pneumatic line 26 to a pneumatic source 30 and a vent to atmosphere 32. In FIG. 3, the actuator 24 includes a multipositional solenoid 34, stepper motor or the like to accurately position the actuator rod 22 and in turn the butterfly valve 16. In FIG. 4, the actuator 24 is a hydraulic actuator defined by a hydraulic piston 38. Hydraulic lines 40 and 42 lead to a hydraulic control valve 44 which can be controlled to provide a plurality of positions for the hydraulic piston 38. A source of hydraulic pressure 46 and a hydraulic pressure relief 48 support the control valve 44.

A number of inputs and outputs are associated with a controller 50 to sense and control a number of conditions of the vehicle drive system. A first input to the controller 50 is that of a speed sensor 52. A speed signal representative of the vehicle speed is now typically provided by the vehicle to the main controller of the vehicle. The actual sensor may be located at any number of positions. It is intended that the vehicle speed sensor 52 be employed to provide the speed signal representative of the speed of the vehicle to the controller 50. The controller 50 or, if available, the main controller of the vehicle can provide a differentiator to generate an acceleration signal as well. The acceleration signal is most conveniently calculated as the time differential of the speed signal.

The states of the engine and drive train are also provided as input signals to the controller 50. The state of the drive coupling 13 is provided by a drive coupling sensor 54 feeding a signal indicative of lock or unlock to the controller 50. A gear selection sensor 56 also provides a signal to the controller 50. The gear selection sensor 56 may be employed for either manual or automatic transmissions 12 to indicate gear position. An overdrive gear sensor 58 may also be provided where appropriate.

The operation of the engine 10 is also presented to the controller 50. An engine speed signal is typically supplied by the conventional vehicle components to the central vehicle controller. This signal from such an engine speed sensor 60 is also provided to the controller 50. An accelerator sensor 62 provides an input to signal when the accelerator pedal is applied. Pressure in the exhaust manifold is sensed by a pressure sensor 64. This device provides an indicator of whether the manifold pressure is above or below a maximum desirable manifold pressure. Such a pressure is selected to be around 60 psi in the preferred embodiment. Other engine conditions such as the state of a warm-up mode 66 may be provided to the controller. The warm-up mode is a feature provided by engine manufacturers on diesel engines where the exhaust is restricted to accelerate engine warm-up. The exhaust brake valve 16 is contemplated to replace the separate warm-up valve now provided on engines with this feature.

Controlling outputs from the controller 50 provide maximum braking capability and control. The controller may provide locking and unlocking signals to the torque converter clutch control 68. Similarly, the controller 50 can provide shift commands to an automatic transmission control 70 and, where applicable, an overdrive control 72. The controller 50 also provides a modulated input to the actuator 24 of the exhaust brake 14.

Finally, the user interface 69 is both in input and output communication with the controller 50. The user interface 69 provides for the input 69A of a vehicle speed value. The user interface 69 also provides an ON/OFF control with a power button. The user interface also communicates with the user when an upshift, downshift, throttle application or foot brake application is desired.

Typically exhaust brakes include some bypass passage to limit the pressure which can be built up in the manifold. Holes through the valve or a gap between the periphery of the valve and the wall of the exhaust system are known to provide the bypass function even with the valve "closed". Separate bypass passages are also known. These prior systems which cannot provide a fully closed position lack adequate performance at low engine speed as the bypass passage is able to accommodate a greater percentage of the total flow under low engine speed operation. To improve low engine speed performance, some systems with a separate bypass passage have included a pressure relief valve to control excess back pressure. This mechanical solution to avoid overpressure through the use of a relief valve is responsive only to such pressure and does not provide for modulation beyond the binary response of fully open or fully closed.

In the preferred embodiment, the operation of the exhaust brake 14 includes the ability both to shut off flow completely and to respond to overpressure through modulation of the valve 16. In the present embodiment, the valve 16 is a butterfly valve with no bypass passage. The butterfly valve 16 is arranged to move from a fully open position with the plane of the butterfly valve being aligned with or parallel to an axis of the surrounding passage to a fully closed position with the valve extending across the passage to fully shut off exhaust flow. The control, using exhaust manifold back pressure, modulates the valve to avoid overpressure and also accommodate a wide range of engine speeds. Intermediate positions between the fully open position and the fully closed position are also provided to gain greater control over the retarding force of the exhaust brake 14. To distinguish between conditions where the valve is closed but may or may not include the possibility of fixed or relief valve controlled bypass as a design solution to avoid overpressure and where the valve is shut off without possibility of effective bypass to avoid overpressure under all conditions, the term "closed" will be used here to denote the former and the term "fully shut" will be used here to denote the latter.

Figures 6, 6A:
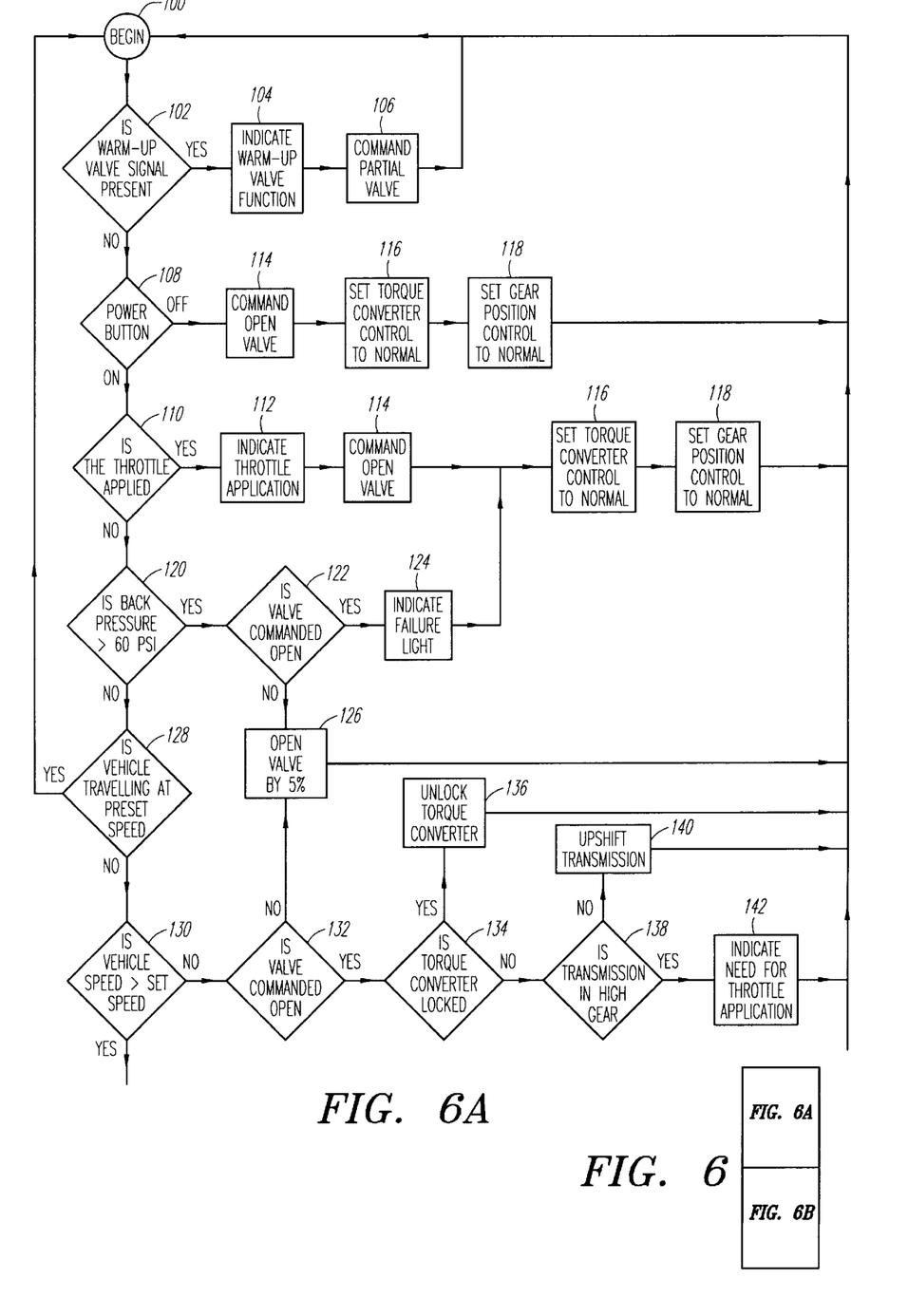
FIG. 6 is a logic flow chart for an exhaust brake control for a vehicle with an automatic transmission and no intake throttle valve.
Figure 6B:
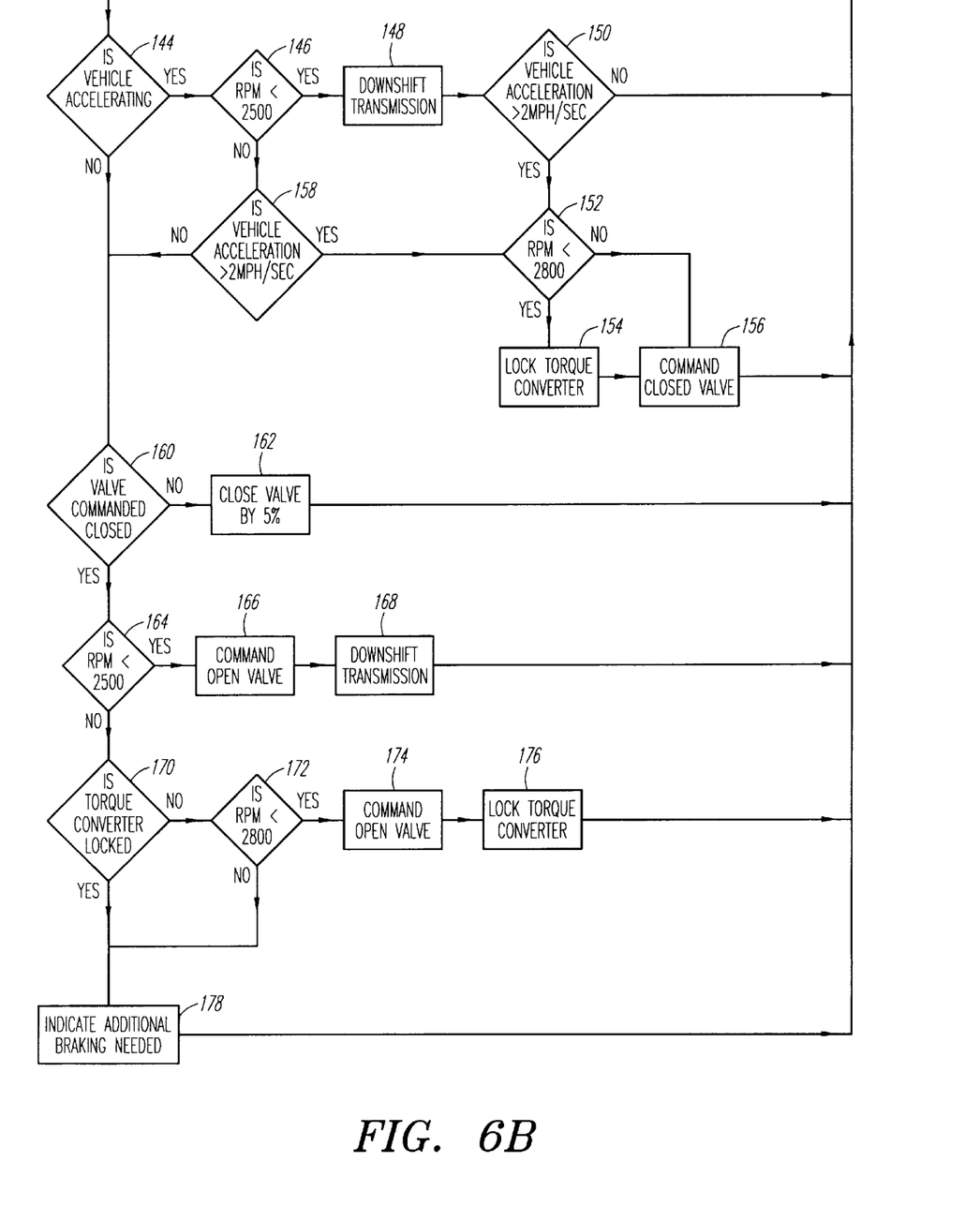

Turning to the operation of the system, the logic flow charts of FIGS. 6 through 9 separately represent the several combinations of automatic or manual transmissions and gasoline or diesel engines. FIG. 6 is directed to an exhaust brake control system for use with a vehicle having an automatic transmission and a diesel engine. The sequence begins at the initial position 100. A first query checks 102 the state of the warm-up signal 66 from the main vehicle controller. The signal derived from the main vehicle controller indicating activation of the warm-up mode is recognized 104 and the actuator 24 is commanded 106 to assume a partially closed position. The activation of the actuator 24 for the warm-up mode is independent of whether the exhaust brake system has been activated by the operator.

If the warm-up signal is not presented to the controller 50, the state of the power button is next sampled 108. When OFF, a command 114 is given to fully open the butterfly valve 16. The torque converter clutch 13 is set 116 to normal and the transmission 12 is also set 118 to normal vehicle control. In this way all conditions are returned to the initial position 100. When the power button of the user interface 69 is ON, the exhaust brake controls are activated under certain circumstances. The exhaust brake system is not to be employed when the accelerator has been applied. The accelerator sensor 62 is sensed 110 for its state of application. If the accelerator is applied, this is recognized 112 and a command 114 is given to fully open the butterfly valve 16. The torque converter clutch 13 is set 116 to normal vehicle control. The transmission 12 is also set 118 to normal vehicle control. This may also include an appropriate setting for an overdrive gear as well.

If no accelerator is applied, the state of pressure within the exhaust system 11 between the internal combustion engine 10 and the exhaust brake 14 samples the pressure sensor 64 to determine 120 back pressure. If the pressure exceeds the preselected maximum amount, 60 psi in this case, the controller 50 is queried 122 to determine if the exhaust valve 16 has been commanded open. If so and if the back pressure is above the acceptable level, an indication is given 124 to the operator by means of a failure light. Further, given the apparent failure mode, the torque converter clutch 13 is set 116 to normal and the transmission 12 is set 118 to normal as well and the cycle returns to initial position 100. If the butterfly valve 16 is not open under the condition of excessive pressure, then a failure is not indicated and the exhaust brake 14 is commanded 126 to open by an incremental amount. Five percent is used in this embodiment. The cycle is then complete and the system returns to the initial position 100.

Where the back pressure within the exhaust system 11 does not exceed the maximum pressure, the speed signal representative of the speed of the vehicle from the speed sensor 52 is sampled 128. If the vehicle is traveling at the preset speed set at the user interface 69, the cycle is complete and returns to the initial position 100.

When the speed differs from that of the vehicle speed value entered through the user interface 69, the vehicle speed sensor 52 is compared 130 to determine if the vehicle is traveling faster than or slower than the vehicle speed value input from the user interface 69. If the vehicle is not traveling faster than the preset speed value, the state of the valve 16 is sensed 132. If the butterfly valve 16 is not already commanded to be open, the valve 16 is opened 126 by a preset increment of five percent. The system then cycles back to the initial position 100 to initiate a new routine. If instead the valve 16 is already commanded to be open, the drive coupling sensor 54 is sampled 134 to determine the condition of the torque converter clutch 13. If the torque converter clutch 13 is locked and the vehicle speed is less than the preset speed value, the torque converter clutch 13 is unlocked 136 and the routine recycles to the initial position 100. If the torque converter clutch 13 is not locked, the gear selection sensor 56 is checked 138. if the transmission 12 is not in high gear, the transmission 12 is commanded 138 to upshift 140 and the routine returns to the initial position 100. If the transmission 12 is already in high gear and the speed is below the set value and the torque converter clutch 13 is unlocked, a signal indicating a need for the application of the accelerator is given 142 to the operator. The routine then recycles back to the initial position 100. Thus, under the circumstance that the vehicle is operating at below the preset speed value, the exhaust brake 14, the torque converter clutch 13 and the transmission 12 are put in states of providing less retarding of the vehicle. Where an overdrive is also included, this too may be engaged under the right engine speed conditions to provide a less retarding state.

If the vehicle speed is greater than the preset speed value, the rate of speed change of the vehicle is determined 144. With the vehicle accelerating, greater measures are taken to retard the vehicle than when the vehicle is not accelerating or is decelerating. When the vehicle is accelerating, the state of the engine is sensed by looking to the engine speed sensor 60 to determine if the engine speed is slow enough that a downshift may be initiated 146. In the preferred embodiment, this engine speed is less than 2500 rpm. Naturally, each engine and transmission assembly would dictate its own engine speed threshold. When the engine speed is low enough, a downshift is commanded 148 of the transmission 12. The magnitude of the acceleration is then determined 150. In this embodiment, the threshold magnitude of acceleration is set at 2 miles per hour per second. If the acceleration is below this threshold level, the routine returns to the initial position 100. If the acceleration is greater than the threshold level, the speed of the engine is determined by sampling the engine speed sensor 60 and comparing 152 the engine speed with a preset high speed value. In this embodiment, the preset high speed value is 2800 rpm. If the engine speed is below the high speed value, the torque converter clutch 13 is locked 154. Once the torque converter clutch 13 is locked 154, the butterfly valve 16 is commanded 156 to close. If the speed of the engine 10 is above the high speed value, the butterfly valve 16 is commanded 156 to be closed regardless of the state of the torque converter clutch 13 and the routine returns to the initial position 100. The command 156 to close the butterfly valve 16 with the preferred embodiment exhaust brake will fully shut off exhaust flow. Modulation based on the state of the pressure sensor 64 will prevent overpressure by opening the valve, steps 120, 122 and 126.

With the sampling 146 of the speed of the engine 10, if the speed is above a minimum threshold, 2500 rpm in this instance, the acceleration is compared 158 with the threshold for excessive acceleration. Again, two mph/second is employed in this embodiment. If the acceleration is too rapid, the speed of the engine is again sensed and compared 152 with the upper value of the speed range. As described above, there is a determination to either command 156 the closure of the butterfly valve 16 or first lock 154 the torque converter clutch and then command 156 the closure of the butterfly valve 16.

Where the vehicle acceleration is not above the upper threshold value, and the engine speed is above the value allowing a downshift, or if the vehicle is not accelerating, the exhaust brake 14 is checked 160 to see if the butterfly valve 16 is fully closed. If not, the actuator 24 is commanded 162 to close the butterfly valve 16 by an increment to increase the exhaust brake application. In this embodiment, the increment has been established as five percent. If the exhaust brake 14 is already fully applied, the drive train is next turned to for increasing the braking effect of the engine.

The speed of the engine is again sensed and compared 164 with the established standard for safe downshifting. In this example, the standard is 2500 rpm. If the speed is sufficiently low, the butterfly valve 16 is opened 166 and the transmission is commanded 168 to downshift. The routine then cycles to the initial position 100. If the engine speed is too high for downshifting, the status of the drive coupling sensor 54 is sensed 170. If the torque converter clutch 13 is not locked, the speed of the engine is again sensed 172. If the speed is no greater than the upper limit for locking the torque converter clutch 13, 2800 rpm in this example, the butterfly valve 16 is opened 174 and the torque converter clutch 13 is locked 176. The routine then recycles to the initial position 100. With the exception of the possible disengagement of an overdrive as a further retarding step, all has been done with the exhaust brake control system and further braking must be provided by additional means. Consequently, if the torque converter clutch 13 is locked or the engine speed is too high to lock the torque converter clutch 13, an indicator is energized 178 to indicate to the operator that additional braking is required. The system then recycles to the initial position 100.

When either more or less braking is needed, the torque converter clutch, the transmission and the exhaust brake are selectively controlled. The hierarchy of these controls depends on empirical vehicle dynamics.

Figure 5:
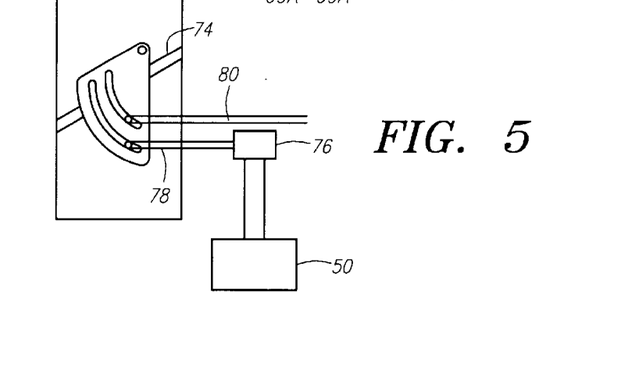
FIG. 5 is a mechanical schematic of an intake throttle valve.
Figures 7, 7A:
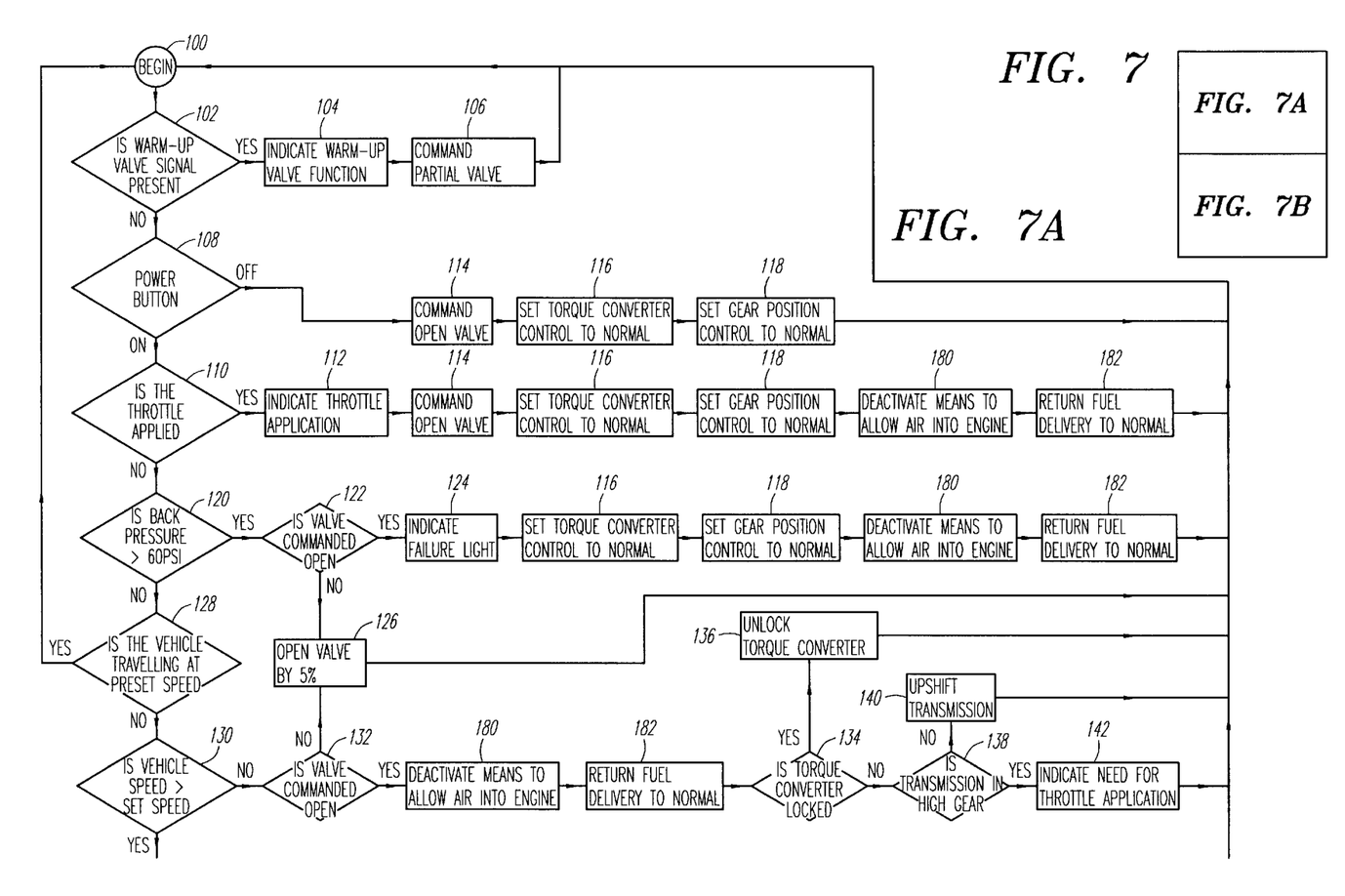
FIG. 7 is a logic flow chart for an exhaust brake control for a vehicle with an automatic transmission and an intake throttle valve.
Figure 7B:
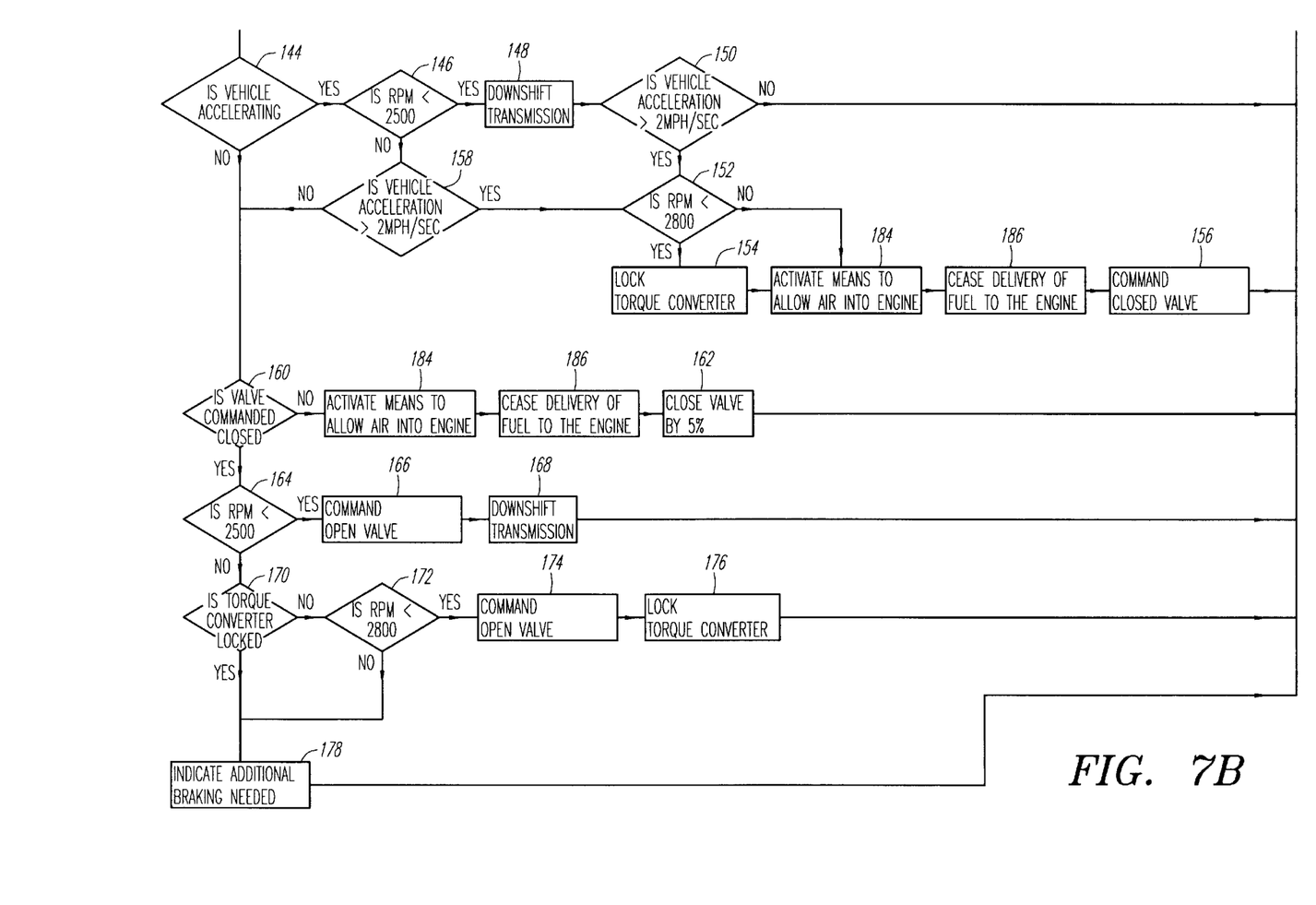

Looking next to FIGS. 5 and 7, the system of FIG. 6 is presented for a gasoline engine. Rather than repeat all of the steps, the differences associated with a throttled engine will be specifically described. The applicable reference numbers from the prior description will be incorporated here where the steps are employed to the same effect. The use of an exhaust brake 14 in association with a gasoline engine requires the manipulation of the throttled intake air to the engine. If not opened with application of the exhaust brake 14, the throttle creates intake vacuum which works at cross purposes to the closure of the exhaust brake valve 16. One reduces pressure in the engine and the other increases pressure in the engine. Consequently, when the exhaust brake valve 16 is to be closed, an intake throttle valve 74 is opened to allow full charging with incoming air. With the fuel shut off and the engine above idle, opening of the intake throttle valve 74 does not increase power. The controller 50 controls an intake valve actuator 76 which actuates a link 78 to open the valve independently of the accelerator linkage 80. The controller 50 also provides a signal to the fuel system to terminate fuel delivery upon activation of the exhaust brake 14. The intake throttle valve 74 may be the normal valve used to control the engine. However, it may also be a separate valve associated with the intake manifold to bypass the valve controlled by the accelerator pedal. The use of the term "intake throttle valve" is to be inclusive of either.

When there is an indication that the throttle has been applied 110, the actuator 76 holding the intake throttle valve 74 open is deactivated 180 and fuel delivery is returned 182 to normal. This series of steps to disable all of the exhaust brake controls returns the vehicle to a power running condition. Even if the throttle is not applied but the back pressure in the manifold has exceeded the maximum limit and the valve is commanded open, the deactivation of the exhaust brake system and the inlet control is once again performed as with the applied throttle.

Similarly, when the vehicle speed is less than the preset speed value and the exhaust brake valve 16 is commanded open, the activator 76 for opening the intake throttle valve 74 is released 180 and the fuel delivery is returned 182 to normal.

Turning then to the conditions where the exhaust braking is initiated or increased, under the conditions of rapid vehicle acceleration the activator 76 is activated 184 to hold the intake throttle valve 74 open for air flow into the engine and fuel delivery is cut off 186. When the vehicle is not accelerating but the speed of the vehicle is above the preset vehicle speed value, and the butterfly valve 16 is not commanded closed, the activator 76 opens 184 the intake throttle valve 74 and fuel is cut off 186. In these circumstances, the closure or partial closure of the butterfly valve 16 is enhanced in operation because the intake throttle valve 74 to the engine is opened.

Figures 8, 8A:
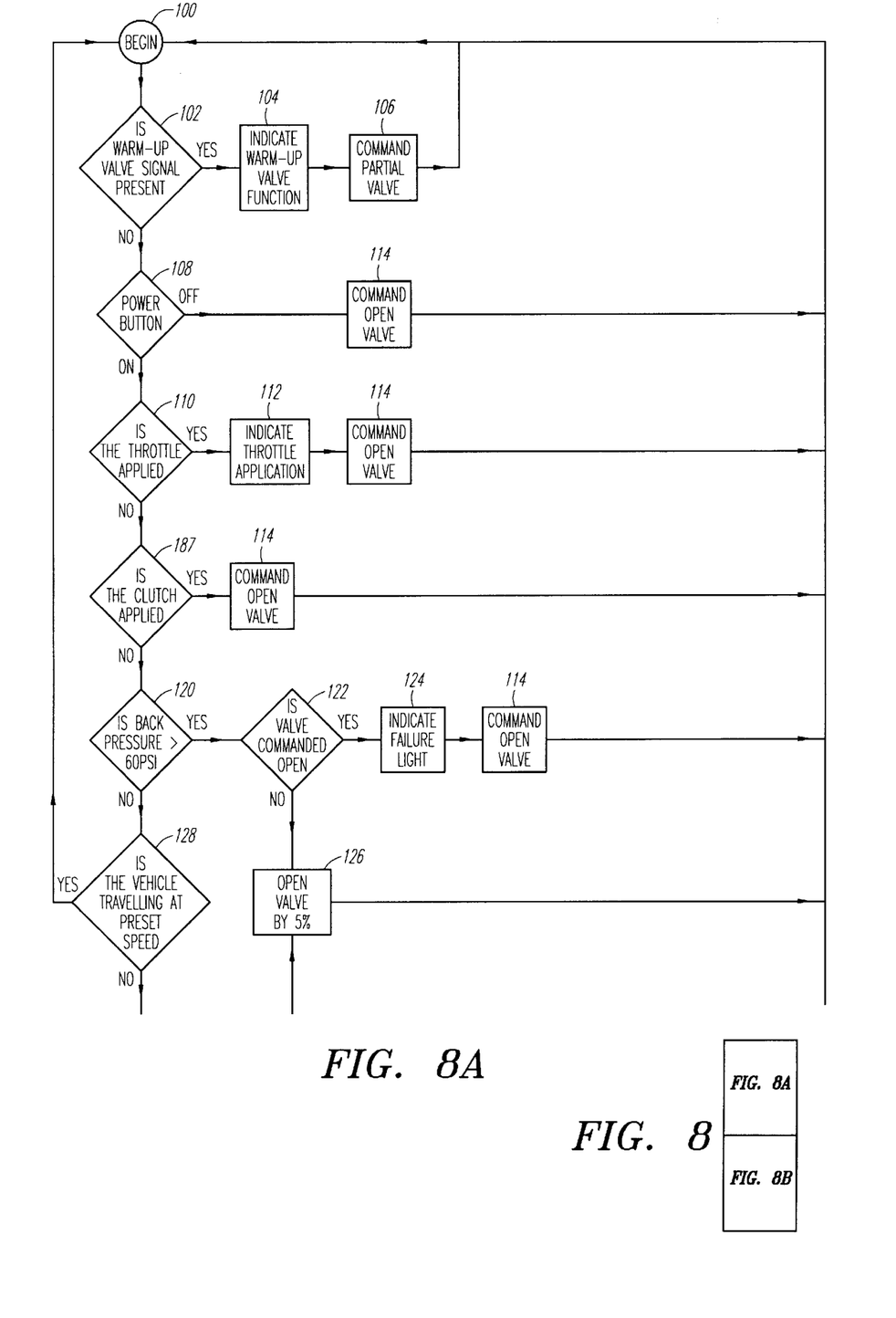
FIG. 8 is a logic flow chart for an exhaust brake control for a vehicle with a manual transmission and no intake throttle valve.
Figure 8B:
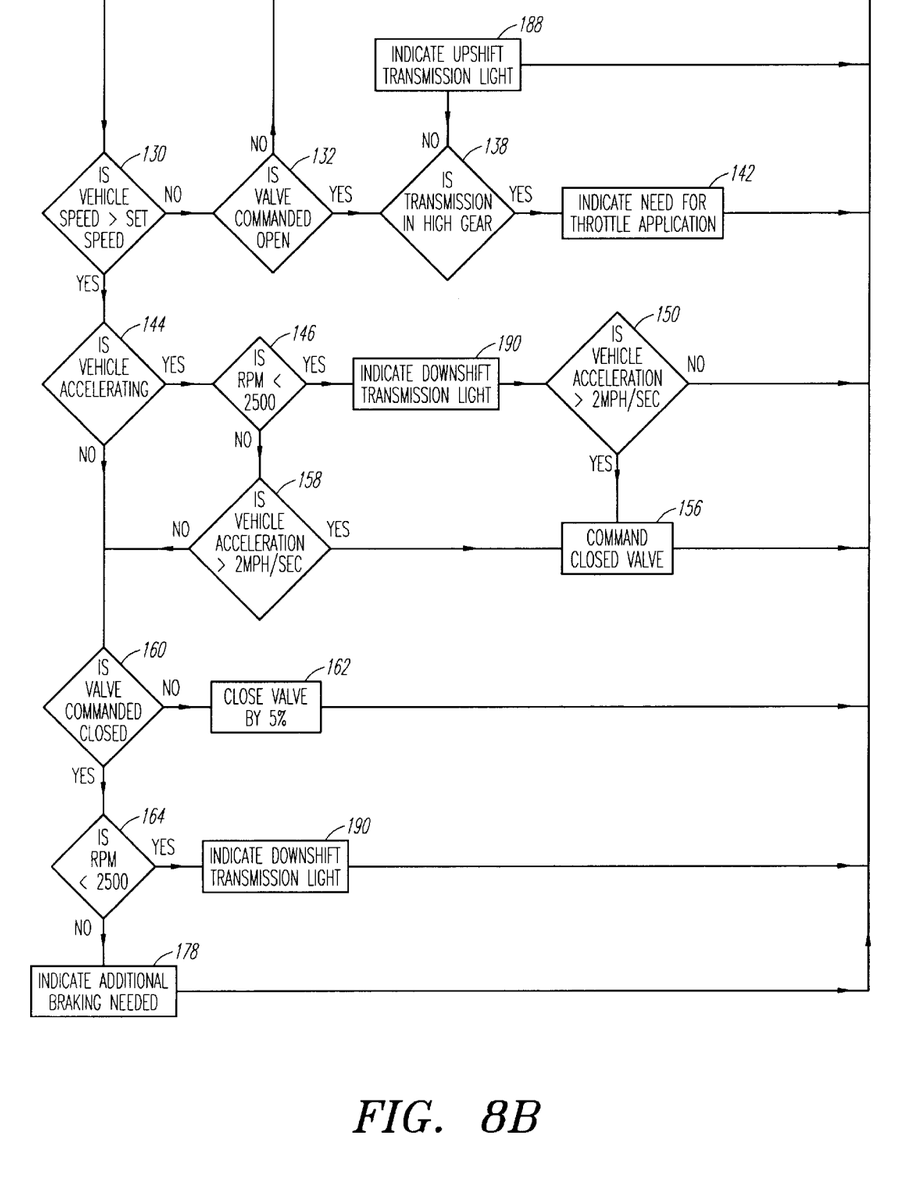

FIG. 8 sets forth the schematic for an exhaust brake control system for a diesel type engine employing a manual transmission 12. The reference numbers may be compared with those of FIGS. 6 and 7 where the steps are to the same effect. Because the drive train includes a manual transmission 12, no mechanism is provided for automatically actuating the drive coupling 13 or the transmission 12. Consequently, the system can only provide signals to the operator for upshifting and downshifting. As the clutch 13 is under operator control, a test 187 senses for an applied clutch, and if so the valve is opened 114. Consequently, the several steps found in the embodiment of FIG. 6 to lock or unlock the drive coupling 13 are eliminated as are transmission shifts. Instead, when the vehicle speed is less than the preset speed value, and the exhaust brake 14 is disabled, the system will indicate 188 the need to upshift the transmission 12 if the transmission 12 is not yet in high gear. A light may be employed on the user interface 69 to convey that information to the operator. When the vehicle speed is greater than the preset vehicle speed value and the vehicle is accelerating, a downshift is indicated 190 if the engine is in a speed range low enough to accept the downshift. Similarly, if the vehicle is traveling at a greater rate of speed than the preset vehicle speed value but the vehicle is not accelerating and the butterfly valve 16 is closed, a downshift is indicated 190 by the user interface 69 when the speed of the engine is low enough to accommodate such a downshift.

Figures 9, 9B:
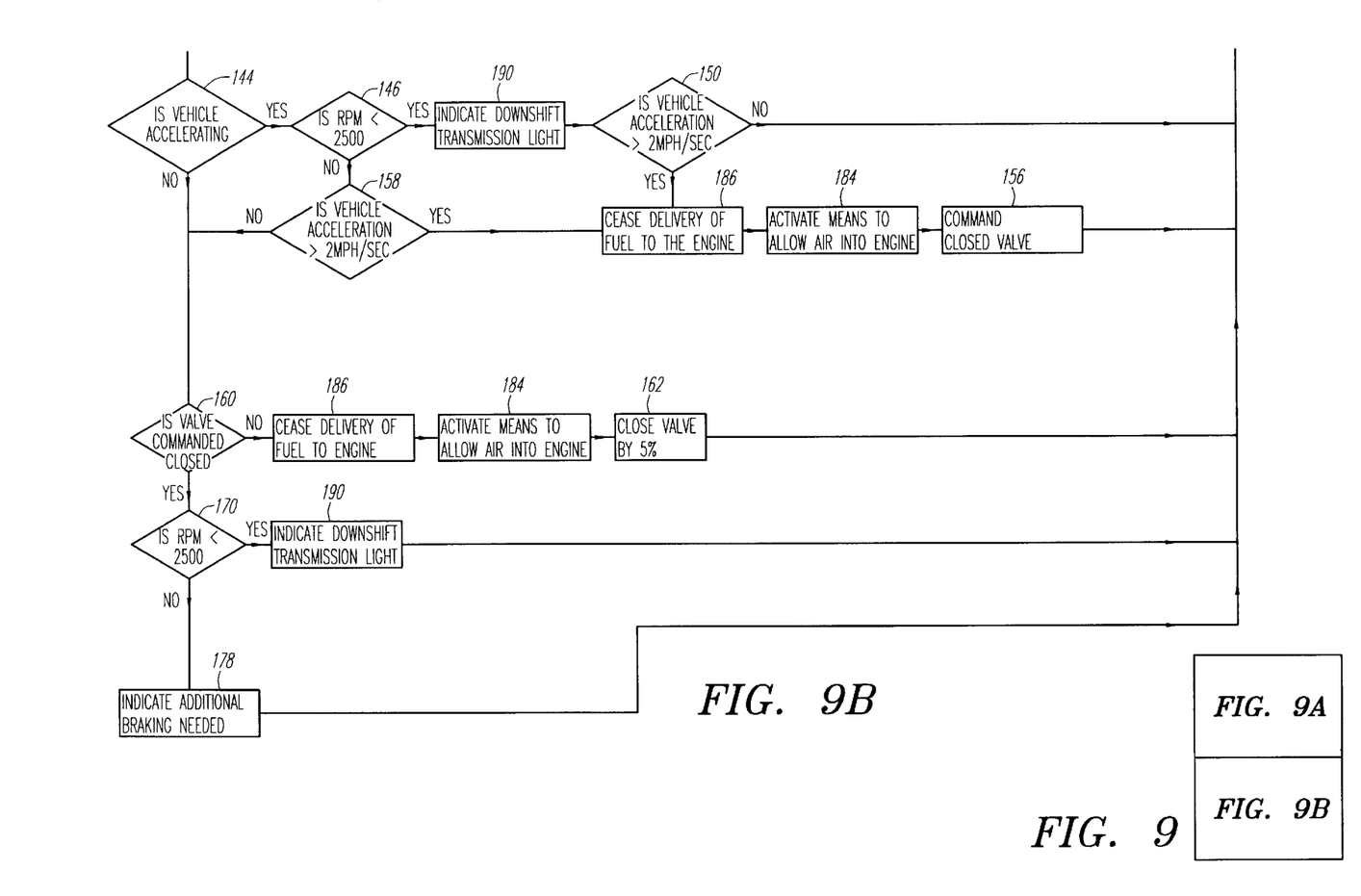
FIG. 9 is a logic flow chart for an exhaust brake control for a vehicle with a manual transmission and an intake throttle valve.
Figure 9A:
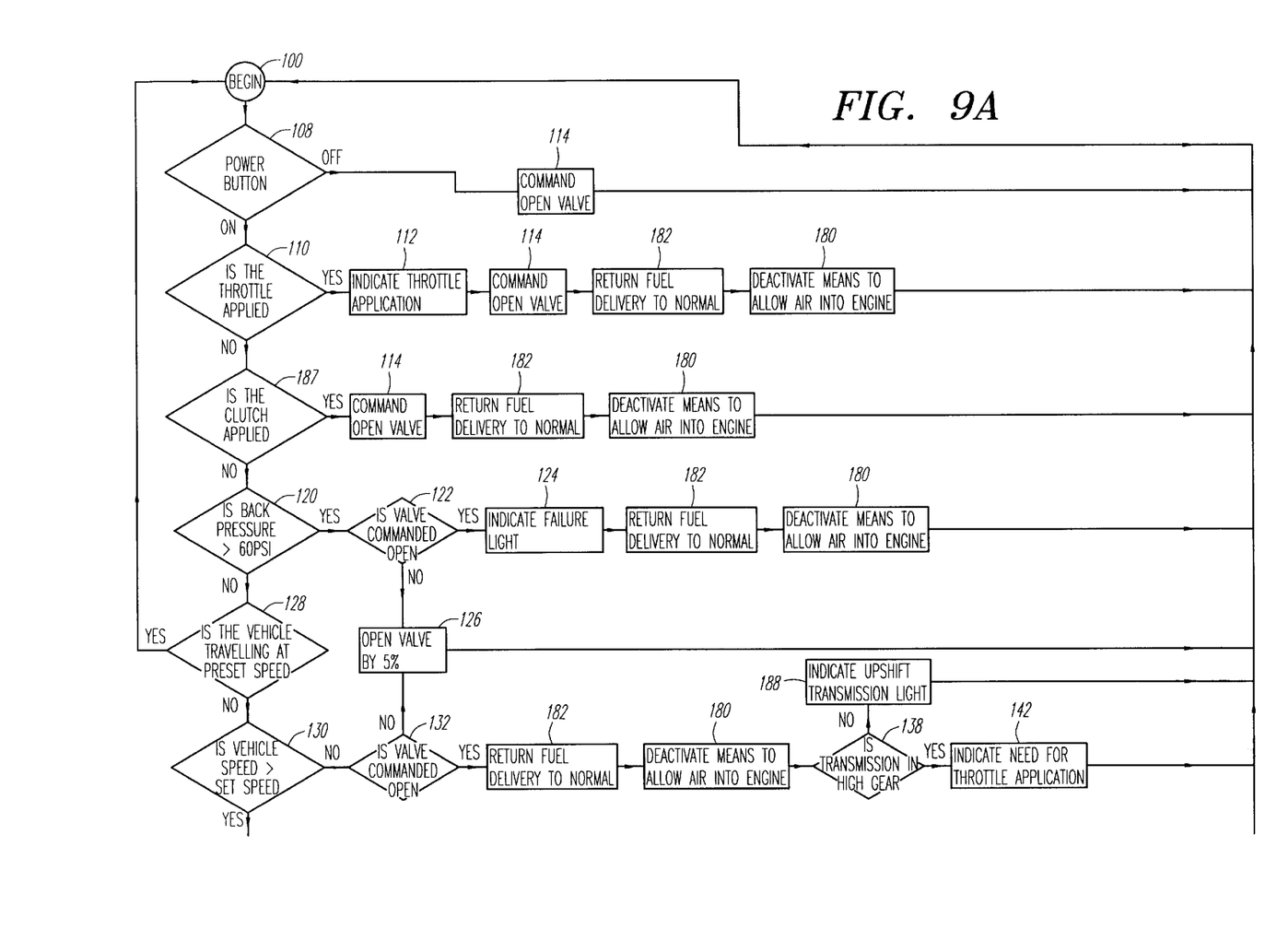

Looking lastly to FIG. 9 which illustrates an exhaust brake control system for a gasoline-type engine having an intake throttle operating with a manual transmission, again the reference numerals reflect the same steps presented in the prior figures. In effect, the steps of activating or deactivating the inlet valve to the engine 184 and 180 and the initiation of fuel delivery 182 and the ceasing of fuel delivery 186 are employed at similar locations to that of FIG. 7. As presented in FIG. 8, the device of FIG. 9 eliminates control of the drive coupling and of the transmission. Instead, indicator lights for upshifting 188 and downshifting 190 are employed.

The rate at which the program cycles through the foregoing steps in any of these embodiments is advantageous in that rapid control, such as response to overpressure, can be achieved. However, the rate of cycling where, for example, valve closure is at a rate of 5% per cycle is too rapid. The perceived closure would be almost instantaneous. Consequently, delays are contemplated where the rate of change is preferably more moderate. In the example, the closure rate of the valve would be better performed at 20% per second rather than per cycle. At this rate, there would be four 5% closures per second. Going from fully open to fully closed would then take five seconds. Greater or lesser rates may be employed depending on such factors as driver perceptions and the magnitude of the braking needed. Therefore, additional steps delaying the initiation of valve adjustments and other actions where a specific rate of change is advantageous are contemplated to achieve improved drivability and system performance.

Thus, controls are provided for the maximum employment of an exhaust brake to a plurality of engine types and drive train configurations. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An exhaust brake for a vehicle drive system having an internal combustion engine with an exhaust system, an automatic transmission and a torque converter clutch, comprising a vehicle speed sensor including a speed signal representative of the speed of the vehicle;

an exhaust brake valve in the exhaust system;

a controller in communication with the speed sensor to receive the speed signal and coupled with the exhaust brake valve, the controller including an open position command with the exhaust brake valve open, a closed position command with the exhaust brake valve closed, a plurality of intermediate position commands between the open position command and the closed position command with the exhaust brake valve in corresponding intermediate positions between the open position and the closed position, output shift commands to the automatic transmission and locking and unlocking signals to the torque converter clutch, the position command of the controller being determined by conditions of the vehicle drive system including the vehicle speed signal.

2. An exhaust brake for a vehicle drive system having an internal combustion engine with an exhaust system, comprising a vehicle speed sensor including a speed signal representative of the speed of the vehicle;

an exhaust brake valve in the exhaust system;

an intake throttle valve in the internal combustion engine;

a controller in communication with the speed sensor to receive the speed signal and coupled with the exhaust brake valve, the controller including a throttle valve opening signal controlling the intake throttle valve, an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the vehicle speed signal.

3. An exhaust brake for a vehicle drive system having an internal combustion engine with an exhaust system, comprising a vehicle speed sensor including a steed signal representative of the speed of the vehicle:

an exhaust brake valve in the exhaust system;

a controller in communication with the speed sensor to receive the speed signal and coupled with the exhaust brake valve, the controller including an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the vehicle speed signal;

a user interface with an ON/OFF switch and a vehicle speed selector in communication with the controller.

4. The exhaust brake of claim 3 further comprising an engine speed sensor in communication with the controller.

5. The exhaust brake of claim 4, the vehicle drive system having a transmission, the exhaust brake further comprising a transmission gear position sensor in communication with the controller.

6. An exhaust brake for a vehicle drive system having an internal combustion engine with an exhaust system, an automatic transmission and a torque converter with a clutch, comprising a vehicle speed sensor including a speed signal representative of the speed of the vehicle;

an exhaust brake valve in the exhaust system;

a controller in communication with the speed sensor to receive the speed signal and coupled with the exhaust brake valve, the controller including an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the vehicle speed signal;

an engine speed sensor in communication with the controller;

a transmission gear position sensor in communication with the controller, the controller further including output shift commands to the automatic transmission and locking and unlocking signals to the torque converter clutch.

7. An exhaust brake for a vehicle drive system having an internal combustion engine, an exhaust system coupled with the internal combustion engine and a transmission coupled to the internal combustion engine, comprising a vehicle speed sensor including a speed signal representative of the speed of the vehicle;

an exhaust brake valve in the exhaust system;

a controller in communication with the speed sensor to receive the speed signal and coupled with the exhaust brake valve, the controller including an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the speed signal;

a user interface with an ON/OFF switch and a vehicle speed selector in communication with the controller;

an engine speed sensor in communication with the controller;

a transmission gear position sensor in communication with the controller.

8. The exhaust brake of claim 7, the transmission being an automatic transmission with a torque converter clutch, the controller further including shift commands to the automatic transmission and locking and unlocking signals to the torque converter clutch.

9. An exhaust brake for a vehicle drive system having an internal combustion engine, an exhaust system coupled with the internal combustion engine and a transmission coupled to the internal combustion engine, comprising a vehicle speed sensor including a speed signal representative of the speed of the vehicle;

an exhaust brake valve in the exhaust system;

an intake throttle valve in the internal combustion engine;

a controller in communication with the speed sensor to receive the speed signal and coupled with the exhaust brake valve, the controller including a throttle valve opening signal controlling the intake throttle valve, an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the speed signal;

a user interface with an ON/OFF switch and a vehicle speed selector in communication with the controller;

an engine speed sensor in communication with the controller;

a transmission gear position sensor in communication with the controller.

10. An exhaust brake for a vehicle, comprising a drive system including an internal combustion engine, with an exhaust system;

a speed sensor including a speed signal representative of speed of the vehicle;

an exhaust brake valve positionable in the exhaust system;

a controller in communication with the speed sensor to receive the speed signal and coupled with the exhaust brake valve, the controller including an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the speed signal;

a user interface with an ON/OFF switch and a vehicle speed selector in communication with the controller.

11. The exhaust brake of claim 10 further comprising an automatic transmission with a torque converter clutch, the controller further including shift commands to the automatic transmission and locking and unlocking signals to the torque converter clutch.

12. An exhaust brake for a vehicle, comprising a drive system including an internal combustion engine; with an exhaust system;

a speed sensor including a speed signal representative of the speed of the vehicle;

an exhaust brake valve positionable in the exhaust system;

an intake throttle valve in the internal combustion engine;

a controller in communication with the speed sensor to receive the speed signal and coupled with the exhaust brake valve, the controller including a throttle valve opening signal controlling the intake throttle valve, an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the speed signal.

13. The exhaust brake of claim 10 further comprising
an engine speed sensor in communication with the controller.

14. The exhaust brake of claim 13 further comprising
a transmission gear position sensor in communication with the controller, the vehicle drive system having a transmission.

15. The exhaust brake of claim 14, the vehicle drive system having an automatic transmission and a torque converter clutch, the controller further including output shift commands to the automatic transmission and locking and unlocking signals to the torque converter clutch.

16. An exhaust brake comprising
a vehicle drive system including an internal combustion engine, an exhaust system coupled with the internal combustion engine and a transmission coupled to the internal combustion engine;
a speed sensor including a speed signal representative of speed of the vehicle;
an exhaust brake valve in the exhaust system;
a controller in communication with the speed sensor to receive the speed signal and coupled with the exhaust brake valve, the controller including an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the speed signal;
a user interface with an ON/OFF switch and a vehicle speed selector in communication with the controller;
an engine speed sensor in communication with the controller;
a transmission gear position sensor in communication with the controller.

17. The exhaust brake of claim 16, the transmission being an automatic transmission with a torque converter clutch, the controller further including output shift signals to the automatic transmission and output control signals to the torque converter clutch.

18. An exhaust brake comprising
a vehicle drive system including an internal combustion engine, an exhaust system coupled with the internal combustion engine and a transmission coupled to the internal combustion engine;
a speed sensor including a speed signal representative of the speed of the vehicle;
an exhaust brake valve in the exhaust system;
an intake throttle valve in the internal combustion engine;
a controller in communication with the speed sensor to receive the speed signal and coupled with the exhaust brake valve, the controller including a throttle valve opening signal controlling the intake throttle valve, an open position command with the exhaust brake valve open, a closed position command with the exhaust brake valve closed and a plurality of intermediate position commands between the open position command and the closed position command with the exhaust brake valve in corresponding intermediate positions between the open position and the closed position, the position command of the controller being determined by conditions of the vehicle drive system including the speed signal;
a user interface with an ON/OFF switch and a vehicle speed selector in communication with the controller;
an engine speed sensor in communication with the controller;
a transmission gear position sensor in communication with the controller.

19. An exhaust braking method comprising
selecting a vehicle speed value;
sensing vehicle speed;
comparing the vehicle speed value and the vehicle speed;
modulating exhaust flow responsive to the difference between the vehicle speed value and the vehicle speed.

20. The exhaust braking method of claim 19 further comprising
calculating the rate of change of the vehicle speed from the sensing vehicle speed;
modulating exhaust flow responsive to the rate of change of the vehicle speed.

21. The exhaust braking method of claim 20 further comprising
sensing engine speed;
locking and unlocking a torque converter clutch responsive to the difference between the vehicle speed value and the vehicle speed, to the rate of change of the vehicle speed and to the engine speed.

22. The exhaust braking method of claim 21 further comprising
sensing the gear position of an automatic transmission;
upshifting and downshifting the automatic transmission responsive to the difference between the vehicle speed value and the vehicle speed, to the rate of change of the vehicle speed, to the engine speed, to the state of the torque converter clutch and to the gear position of the automatic transmission.

23. The exhaust braking method of claim 20 further comprising
sensing engine speed;
sensing gear position of a transmission;
indicating upshift commands and downshift commands responsive to engine speed, to the gear position of the transmission, to the difference between the vehicle speed value and the vehicle speed and to the rate of change of the vehicle speed.

24. The exhaust braking method of claim 19 further comprising
shutting off fuel to the engine upon modulating the exhaust flow;
opening an intake throttle valve to the engine upon modulating the exhaust flow.

25. The exhaust braking method of claim 19 further comprising
applying more engine braking force with the vehicle speed value less than the vehicle speed including selecting among modulating exhaust flow by incrementally closing an exhaust valve, downshifting an automatic transmission and locking a torque converter clutch with the vehicle speed value less than the vehicle speed.

26. The exhaust braking method of claim 25 further comprising
abating engine braking force with the vehicle speed value greater than the vehicle speed including selecting among modulating exhaust flow by incrementally opening an exhaust valve, upshifting an automatic transmission and unlocking a torque converter clutch with the vehicle speed value greater than the vehicle speed.

27. The exhaust braking method of claim 25 further comprising calculating the rate of change of the vehicle speed from the sensing vehicle speed, modulating exhaust flow including fully closing the exhaust valve with vehicle acceleration above a preselected value.

28. An exhaust braking method comprising selecting a vehicle speed value;

sensing vehicle speed;

comparing the vehicle speed value and the vehicle speed;

modulating exhaust flow responsive to the difference between the vehicle speed value and the vehicle speed;

calculating the rate of change of the vehicle speed from the sensing vehicle speed;

modulating exhaust flow responsive to the rate of change of the vehicle speed;

applying more engine braking force with the vehicle speed value less than the vehicle speed including selecting among modulating exhaust flow by incrementally closing an exhaust valve, downshifting an automatic transmission and locking a torque converter clutch with the vehicle speed value less than the vehicle speed;

abating engine braking force with the vehicle speed value greater than the vehicle speed including selecting among modulating exhaust flow by incrementally opening an exhaust valve, upshifting an automatic transmission and unlocking a torque converter clutch with the vehicle speed value greater than the vehicle speed.

29. The exhaust braking method of claim 28 further comprising sensing engine speed;

locking and unlocking a torque converter clutch responsive to the difference between the vehicle speed value and the vehicle speed, to the rate of change of the vehicle speed and to the engine speed.

30. The exhaust braking method of claim 29 further comprising sensing the gear position of an automatic transmission;

upshifting and downshifting the automatic transmission responsive to the difference between the vehicle speed value and the vehicle speed, to the rate of change of the vehicle speed, to the engine speed, to the state of the torque converter clutch and to the gear position of the automatic transmission.

31. The exhaust braking method of claim 28 further comprising sensing engine speed;

sensing gear position of a transmission;

indicating upshift commands and downshift commands responsive to engine speed, to the gear position of the transmission, to the difference between the vehicle speed value and the vehicle speed and to the rate of change of the vehicle speed.

32. The exhaust braking method of claim 28 further comprising shutting off fuel to the engine upon modulating the exhaust flow;

opening an intake throttle valve to the engine upon modulating the exhaust flow.

33. The exhaust braking method of claim 28 further comprising modulating exhaust flow including fully closing the exhaust valve with vehicle acceleration above a preselected value.

34. An exhaust brake for a vehicle drive system having an internal combustion engine with an exhaust system, comprising a vehicle speed sensor including a speed signal representative of the speed of the vehicle;

an exhaust brake valve in the exhaust system;

a controller in communication with the speed sensor to receive the speed signal and coupled with the exhaust brake valve, the controller including an open position command with the exhaust brake valve open, a closed position command with the exhaust brake valve fully shut and a plurality of intermediate position commands between the open position command and the closed position command with the exhaust brake valve in corresponding intermediate positions between the open position and the fully shut position, the position command of the controller being determined by conditions of the vehicle drive system including the vehicle speed signal.

35. An exhaust braking method comprising sensing exhaust manifold pressure;

comparing the sensed manifold pressure with a maximum pressure value;

modulating an exhaust valve from fully shut to open responsive to the difference between the sensed manifold pressure and the maximum pressure value.

36. An exhaust braking method comprising selecting a vehicle speed value;

sensing vehicle speed;

comparing the vehicle speed value and the vehicle speed;

sensing exhaust manifold pressure;

comparing the sensed manifold pressure with a maximum pressure value;

modulating an exhaust valve from fully shut to open and to intermediate positions therebetween responsive to the difference between the vehicle speed value and the vehicle speed and the difference between the sensed manifold pressure and the maximum pressure value.

* * * * *